United States Patent
Plas et al.

(10) Patent No.: US 10,253,486 B2
(45) Date of Patent: Apr. 9, 2019

(54) WATER—SAVING TOILET

(71) Applicant: SIAMP CEDAP, Monaco (MC)

(72) Inventors: Olivier Plas, La Trinite (FR); Romain Jallon, Montreal (CA)

(73) Assignee: SIAMP CEDAP, Monaco (MC)

( * ) Notice: Subject to any disclaimer, the term of this patent is extended or adjusted under 35 U.S.C. 154(b) by 0 days.

(21) Appl. No.: 14/785,060

(22) PCT Filed: Apr. 18, 2014

(86) PCT No.: PCT/EP2014/058016
§ 371 (c)(1),
(2) Date: Oct. 16, 2015

(87) PCT Pub. No.: WO2014/170486
PCT Pub. Date: Oct. 23, 2014

(65) Prior Publication Data
US 2016/0083949 A1 Mar. 24, 2016

Related U.S. Application Data

(60) Provisional application No. 61/813,355, filed on Apr. 18, 2013.

(51) Int. Cl.
*E03D 5/10* (2006.01)
*E03D 1/14* (2006.01)

(52) U.S. Cl.
CPC .............. *E03D 5/105* (2013.01); *E03D 1/14* (2013.01); *Y02A 20/412* (2018.01)

(58) Field of Classification Search
CPC .............. E03D 5/10; E03D 5/105; E03D 1/14
(Continued)

(56) References Cited

U.S. PATENT DOCUMENTS 4,860,767 A   8/1989   Maekawa
4,883,749 A * 11/1989   Roberts ................. A47K 11/04
                                                        4/304

(Continued)

FOREIGN PATENT DOCUMENTS

DE   29918335 U1   12/1999
EP    1378612 A1    1/2004
(Continued)

OTHER PUBLICATIONS

International Search Report for corresponding International PCT Application No. PCT/EP2014/058016, dated Oct. 15, 2014.

*Primary Examiner* — Erin Deery
(74) *Attorney, Agent, or Firm* — Workman Nydegger

(57) ABSTRACT

In a toilet comprising a toilet bowl, the water-saving system comprises a first emitter for emitting a first beam having a first wavelength comprised between 300 and 495 nm. A second emitter for emitting a second beam has a second wavelength comprised between 590 and 900 nm, at least one detector for receiving the first and second beams. The first emitter, second emitter and detector(s) are installed on the toilet such that the first beam and second beam pass through the water contained in the toilet bowl before being received by the detector(s). A controller receives and processes data from the detector(s), and the data representing the waste level in the toilet bowl. A flush volume actuator is actuated by the controller for flushing a variable volume of water as a function of the data, so as to minimize the volume of water.

15 Claims, 7 Drawing Sheets

(58) Field of Classification Search
USPC .................................. 4/304, 305; 251/129.04
See application file for complete search history.

(56) References Cited

U.S. PATENT DOCUMENTS

| | | | |
|---|---|---|---|
| 4,961,431 A | | 10/1990 | Ikenaga et al. |
| 4,982,741 A | | 1/1991 | Saito et al. |
| 5,025,516 A | * | 6/1991 | Wilson .................... E03C 1/057 |
| | | | 250/221 |
| 5,184,359 A | | 2/1993 | Tsukamura et al. |
| 6,250,601 B1 | * | 6/2001 | Kolar ....................... E03C 1/057 |
| | | | 251/129.04 |
| 8,796,627 B2 | * | 8/2014 | Rockwell ............... G01N 21/55 |
| | | | 250/341.8 |
| 2005/0028260 A1 | | 2/2005 | Ling |
| 2006/0096017 A1 | | 5/2006 | Yamasaki et al. |
| 2008/0169301 A1 | * | 7/2008 | Mok ....................... A47K 10/36 |
| | | | 221/9 |
| 2010/0088812 A1 | | 4/2010 | Chen et al. |
| 2010/0146691 A1 | | 6/2010 | Chan |
| 2011/0146800 A1 | | 6/2011 | Jallon et al. |
| 2013/0245498 A1 | * | 9/2013 | Delaney ................. A61B 5/742 |
| | | | 600/584 |

FOREIGN PATENT DOCUMENTS

| | | | | |
|---|---|---|---|---|
| WO | 2001073228 A1 | | 10/2001 | |
| WO | WO 0173228 A1 | * | 10/2001 | ............. E03D 5/105 |

\* cited by examiner

WATER—SAVING TOILET

BACKGROUND

This invention relates generally to toilets. More specifically, this invention relates to apparatuses and methods for manufacturing water—saving toilets using specific emitters and detectors.

Water is a precious commodity that should be used efficiently. For this reason, many have explored ways to use less (save) domestic water by modifying household devices such as faucets, showers, baths and toilets.

For example, Hefti (EP1378612) teaches providing cameras in the dry portions of the toilet that capture images relating to the "solids" content of a toilet bowl where a camera captures images from inside the bowl and another camera captures images from the "siphon", and adjusts flush (wash water) volume as a function of the excrements visually detected.

Chan (US20100146691) teaches an intelligent flushing system that uses an odor sensor and cameras to monitor interior conditions of a toilet and detect wastes in order to optimize flushing (volume).

Park (WO 01/73228) teaches a toilet that uses an infrared sensor for determining the presence of a user and thereafter generating an "etiquette sound", for hiding certain unpleasant sounds associated with defecation. The Park toilet also uses optical emitters/sensors in order to adjust flush volume by discriminating the presence of urine (weak reflection) and feces (strong reflection) based on their ability to reflect the optical signal.

Tsukamura (U.S. Pat. No. 5,184,359) teaches a health monitoring toilet having a UV source for emitting ultraviolet radiation for the purpose of "deodorizing" the contaminants found in the toilet bowl.

Chen (US20100088812) teaches a urinal having a hidden sensor to determine urine concentration using electrodes that measure conductivity of a liquid in the urinal. The urinal then determines an appropriate volume of flush water based on the detected urine concentration.

Many references such as Ikenaga U.S. Pat. No. 4,961,431, Maekawa U.S. Pat. No. 4,860,767, Saito U.S. Pat. No. 4,982,741 teach "health monitoring" aspects of various toilets that capture urine or feces in order to detect illnesses or abnormalities in excrement characteristics.

Yamasaki (US 2006/0096017) teaches another "health monitoring toilet" that is designed for determining the volume of voided urine. Yamasaki's main purpose for determining a volume of urine is to measure absolute amounts of various urine constituents, such as glucose and salt. Glucose and salt concentration in urine are not constituents that would require an increase in flush volume as they are both odorless and colorless. Yamasaki discloses modifying the siphon of a toilet in order to provide a siphon-generating element or fluid jet that lowers the level of pooled water prior to urination, thus allowing to easily determine the volume of voided urine. Although the drawing suggest modifying the siphon, the purpose is only to provide a siphon or fluid jet and the modification protrudes from the siphon.

Finally, Jallon US20110146800 teaches a shower system that recycles (or not) water based on the detection of contaminants in the water. The system uses a UV source and detector to detect the presence of urine based on its absorption characteristics.

However, the prior art water—saving toilets are not fully satisfactory as they do not allow to efficiently detect the waste level in the toilet bowl. As a result, it appears that water saving could be further improved.

An object of the invention is to provide a water-saving system which is more effective than the prior art systems.

SUMMARY

This object is achieved by a water-saving system for a toilet comprising a toilet bowl, the water-saving system comprising:

a first emitter for emitting a first beam having a first wavelength $\lambda 1$;

a second emitter for emitting a second beam having a second wavelength $\lambda 2$;

at least one detector for receiving said first and second beams;

the first emitter, second emitter and detector being intended to be installed on the toilet such that the first beam and second beam pass through the water contained in the toilet bowl before being received by the detector;

a controller for receiving and processing data from said detector, said data representing the waste level in the toilet bowl;

a flush volume actuator actuated by said controller for flushing a variable volume of water as a function of said data, so as to minimize said volume of water;

wherein the first and second wavelengths $\lambda 1$, $\lambda 2$ are distinct, $\lambda 1$ being comprised between 300 and 495 nm, and $\lambda 2$ being comprised between 590 and 900 nm.

In other words, the first emitter can emit either in the UV or in the visible spectrum, from violet to blue, while the second emitter can emit either in the IR or in the visible spectrum, from orange to red.

For example, both emitters can emit in the visible spectrum, with distinct wavelengths.

"Distinct" means that the wavelengths $\lambda 1$, $\lambda 2$ are not identical and that the difference between said wavelengths is more than 50 nm, preferably more than 70 nm, most preferably more than 100 nm.

The waste level in the toilet bowl includes urine concentration and the quantity of solid matter, in particular feces and paper.

It has been discovered that using a combination of emitters and detectors at specific wavebands or wavelengths, and possibly at specific locations inside a toilet, makes it possible to efficiently and simultaneously quantify waste. As a result, the invention provides a water-saving toilet system that functions by flushing a minimal amount of water for evacuating contaminants present therein.

For example, in situations where feces are not detected, the toilet flushes a volume of water only as a function of urine concentration while in situations where feces is detected, a greater volume of water is used and urine concentration may be disregarded for determination of the appropriate flush volume. The detector sends information relative to the content of the toilet bowl to a controller that controls the amount of water to be released into the toilet bowl for an appropriate evacuation/flushing of contaminants present therein. The toilet may or may not have manual flushing means and the elements of the present invention may or may not be visible to a user of the toilet. As such, they may be incorporated into the outflow conduit or the toilet bowl itself.

Owing to the combination of two wavelengths, and depending on the number of emitters and their position, the invention makes it possible to automatically adjust the flush volume among at least three volumes (namely low, medium and high), and up to ten volumes.

Furthermore, using emitters emitting in the visible spectrum has many advantages:

said emitters, and the corresponding detectors, can be standard components, which reduces the system cost;
these emitters and detectors are generally smaller than UV or IR components;
the toilet may have pleasing aesthetics due to the visible and coloured light emitted by the emitters. However, the emitters and detectors can be hidden from a user of said toilet.

According to an embodiment of the invention, the first emitter can emit in the blue region of the visible spectrum, $\lambda 1$ being comprised between 450 and 495 nm, for example around 465 nm.

Alternatively, the first emitter can emit in the UV region of the spectrum, $\lambda 1$ being comprised between 300 and 380 nm, for example around 365 nm.

As regards the second emitter, it can emit in the orange region of the visible spectrum, $\lambda 2$ being comprised between 590 and 620 nm, for example around 595 nm.

Alternatively, the second emitter can emit in the IR region of the spectrum, $\lambda 2$ being comprised between 750 and 900 nm, preferably between 800 and 900 nm, for example around 850 nm.

The water-saving system may further comprise a third emitter for emitting a third beam having a third wavelength $\lambda 3$, the third emitter being intended to be installed on the toilet such that the third beam passes through the water contained in the toilet bowl before being received by the detector. Owing to this feature, the flush volume can be adjusted among around 6 to 10 volumes, which is even more efficient if terms of water saving.

In an embodiment, $\lambda 3$ can be comprised either between 300 and 495 nm, or between 590 and 900 nm.

The third emitter can emit in the visible spectrum. According to an embodiment, the third emitter emits in the blue region of the visible spectrum, $\lambda 3$ being comprised between 450 and 495 nm, for example around 465 nm, or in the orange region of the visible spectrum, $\lambda 3$ being comprised between 590 and 620 nm, for example around 595 nm.

Alternatively, the third emitter can emit in the UV or IR spectrum.

At least one emitter can be a light emitting diode (LED), and/or the detector(s) can be a photodiode.

For example, the water-saving system comprises two detectors, which improves the accuracy of the waste level detection.

The invention also relates to a toilet comprising:
a toilet bowl having a bowl portion containing water and a receptacle portion not containing water—except during a flush;
a water supply device;
and a water-saving system as previously described, the flush volume actuator being capable of flushing a variable volume of water from the water supply device.

The water supply device can typically be a water tank. The toilet may further comprise a manual flusher for initiating flushing of said toilet.

According to an embodiment, at least one component among the first emitter, the second emitter, the third emitter—when present—and the detector(s) can be located in the bowl portion (i.e. in the water).

According to an embodiment, at least one component among the first emitter, the second emitter, the third emitter—when present—and the detector(s) can located outside the bowl portion (i.e. not in the water), either in the receptacle portion or on a piece attached to the toilet bowl, such as a toilet lid. With this arrangement, the beam generally has to be reflected on an inside surface of the toilet bowl, or another surface such as a mirror, before being received by the detector.

According to an embodiment:
the first and second emitters are located on a wall of the bowl portion substantially adjacent one another, and arranged to emit beams towards the opposite wall of the bowl portion along a beam direction;
one detector is arranged in the bowl portion on said opposite wall of the bowl portion and is substantially aligned with the emitters along the beam direction;
another detector is arranged on a wall of the bowl portion and is angularly offset from the emitters by an angle of around 90°.

For example, the first and second emitters and the detectors can be located substantially in a same horizontal plane. The beam direction may be the longitudinal direction of the toilet.

As regards the third emitter, it can be arranged on the receptacle portion of the toilet bowl, all the emitters being substantially located in the vertical longitudinal median plane of the toilet bowl. For example, the third emitter can be located close to the upper edge of the toilet bowl.

In some cases, at least some of the emitters and detectors can be placed in a same location, to reduce the number of such locations.

According to an embodiment, the emitters and/or detector(s) are installed in a hole arranged in the toilet bowl, said hole having an opening facing the inside of the toilet bowl. Furthermore, the toilet can comprise a protective wall closing said opening, said protective wall being made of a material allowing the emission or reception of the beams emitted by the emitters. The protective wall is preferably secured in water tight fashion onto the toilet bowl.

The toilet may further comprise a cleaning device for cleaning the protective wall, for example including a fluid jet. Alternatively, the protective wall can be made of a material including a water-repellent treatment, so that cleaning is not necessary.

The protective wall can be made of a material that can resist temperatures up to 1200°. This allows the manufacturing of the toilet bowl by overmoulding process together with the emitters/detectors and then cooking of the ceramic constituting the toilet bowl.

The invention also relates to a method for controlling the volume of flush water of a toilet as a function of the waste level in the toilet bowl, in order to save water, the method comprising:
emitting a first beam having a first wavelength $\lambda 1$ comprised between 300 and 495 nm;
emitting a second beam having a second wavelength $\lambda 2$ comprised between 590 and 900 nm;
detecting the first and second beams after they have passed through the water contained in the toilet bowl;
receiving and processing data resulting from said detection, said data representing the waste level in the toilet bowl;
controlling the volume of flush water as a function of said data.

The water-saving system according to the invention can be installed on new toilets as well as on existing toilets.

In accordance with an aspect of the invention, there is provided a water-saving toilet having emitters/detectors and using a UV waveband for detecting soluble contaminants (urine) and an IR waveband for detecting solid contaminants (feces, toilet paper).

In accordance with another aspect of the invention, there is provided a water-saving toilet having UV emitters and detectors at specific locations inside the toilet bowl for determining a concentration of urine in the toilet and thus, adjusting/varying flush volume for proper evacuation of the urine. It will be appreciated that the UV emitter/detector system can be used independently of any other detection system in a toilet or for example, in a urinal where only urine needs to be identified/quantified.

In a variant, the UV emitter can be replaced by a visible emitter, capable of emitting in the visible region of the spectrum. For example, the wavelength of the beam emitted by this emitter (UV or visible emitter) can be comprised between 300-495 nm, i.e. in the UV region or in the visible region (violet or blue).

In accordance with another aspect of the invention, there is provided a water-saving toilet having IR emitters and detectors at specific locations in and/or on the toilet for determining a quantity of solid contaminants and thus, adjusting/varying flush volume for proper evacuation of solid contaminants such as toilet paper and feces. It will be appreciated that the IR emitter/detector can be used independently in a toilet for quantifying only solid contaminants.

In a variant, the IR emitter can be replaced by a visible emitter, capable of emitting in the visible region of the spectrum. For example, the wavelength of the beam emitted by this emitter (IR or visible) can be comprised between 590-900 nm, i.e. in the IR region or in the visible region (orange or red).

There is provided according to some aspects of the present invention a water—saving system for a toilet comprising a UV emitter for emitting ultraviolet radiation through a wet portion of a toilet bowl; a UV detector for detecting UV radiation from the UV emitter; a solid matter detector for detecting solid matter inside the toilet bowl; a controller for receiving and processing data from the UV detector and the solid matter detector; and a flush volume actuator actuated by the controller for flushing a volume of water as a function of detected contaminants wherein combined data from the UV detector and the solid matter detector allows to minimize the volume of water.

The UV emitter can emit at a wavelength λ1 comprised between 300 and 380 nm, for example around 365 nm.

In a variant, said UV emitter can be replaced by a visible emitter, capable of emitting in the visible region of the spectrum—preferably in the blue region of the visible spectrum, λ1 being comprised between 450 and 495 nm, for example around 465 nm. The detector has to be chosen accordingly, to be capable of detecting the beam emitted by the emitter.

In some embodiments, the solid matter detector comprises an IR detector and the system further comprises an IR emitter for emitting an IR signal detectable by the IR detector.

The IR emitter can emit at a wavelength λ2 comprised between 750 and 900 nm, preferably between 800 and 900 nm, for example around 850 nm.

In a variant, said IR emitter can be replaced by a visible emitter, capable of emitting in the visible region of the spectrum—preferably in the orange region of the visible spectrum, λ2 being comprised between 590 and 620 nm, for example around 595 nm. The detector has to be chosen accordingly, to be capable of detecting the beam emitted by the emitter.

In some embodiments, the UV emitter and UV detector are aligned on opposite sides of a toilet bowl and their optical windows are configured to be located at an open end of a recess extending outwardly from an inside surface of the toilet bowl to prevent fouling and to increase specificity of the signal.

In other embodiments, the IR emitter has a line-of-sight along a longitudinal axis of the toilet and where the UV emitter, UV detector and IR detector have a line-of-sight along a lateral axis of the toilet.

In still other embodiments, the IR emitter has a line-of-sight along a first axis of the toilet and where the UV emitter, UV detector and IR detector have a line-of-sight along a second axis of the toilet, the relative angle between the axes is between zero degrees (aligned) and 90 degrees (perpendicular) to the first axis.

Applicant has discovered that the location of various emitters and detectors allows to optimize contaminant detection. In a preferred embodiment, the UV emitter and detector are located in the lower wet portion of the toilet bowl at opposites sides thereof so as to be in a direct line-of-sight of each other. The IR emitter is located in or around the receptacle portion or receptacle flange outside the wet portion of the toilet bowl so as to be in an indirect line-of-sight with the IR detector. The location of the IR detector can be advantageously paired with either the UV emitter or UV detector. Synergy between the selected detection wavebands and the location of emitters/detectors allows to minimize cross-contamination of the detected signals. In other words, urine does not impede IR detection/quantification of solid contaminants and solid contaminants do not impede the UV detection/quantification of urine.

In yet other embodiments, a fouling indicator is activated when a baseline UV and/or IR value falls below a predetermined threshold, thereby indicating an unacceptable level of fouling of the optical windows. The baseline value is taken in "clean water conditions" such a after a complete flush.

In other aspects of the present invention, there is provided a method of adapting a toilet for saving water comprising making one or more apertures in a toilet bowl portion of a toilet; securing in water tight fashion to the one or more apertures on an outside portion of the toilet bowl a UV emitter, a UV detector and an IR detector for detecting contaminants in the toilet bowl; providing controller for receiving and processing data from the UV and the IR detectors related to the presence of the contaminants; and providing a flush volume actuator controlled by the controller for minimizing a flush volume as a function of the detected contaminants.

Similarly to what was previously described, the UV emitter can be replaced by a visible emitter (preferably in the blue region in the above mentioned range of wavelengths); the IR emitter can be replaced by a visible emitter (preferably in the orange region in the above mentioned range of wavelengths).

In some embodiments, the method further comprises recessing the emitters and the detectors away from an inside surface of the toilet bowl for increasing specificity and decreasing fouling of the detectors and emitters.

BRIEF DESCRIPTION OF THE DRAWINGS

The invention will be better understood by way of the following detailed description of embodiments of the invention with reference to the appended drawings, in which.

DETAILED DESCRIPTION OF VARIOUS EMBODIMENTS

Figure 1:
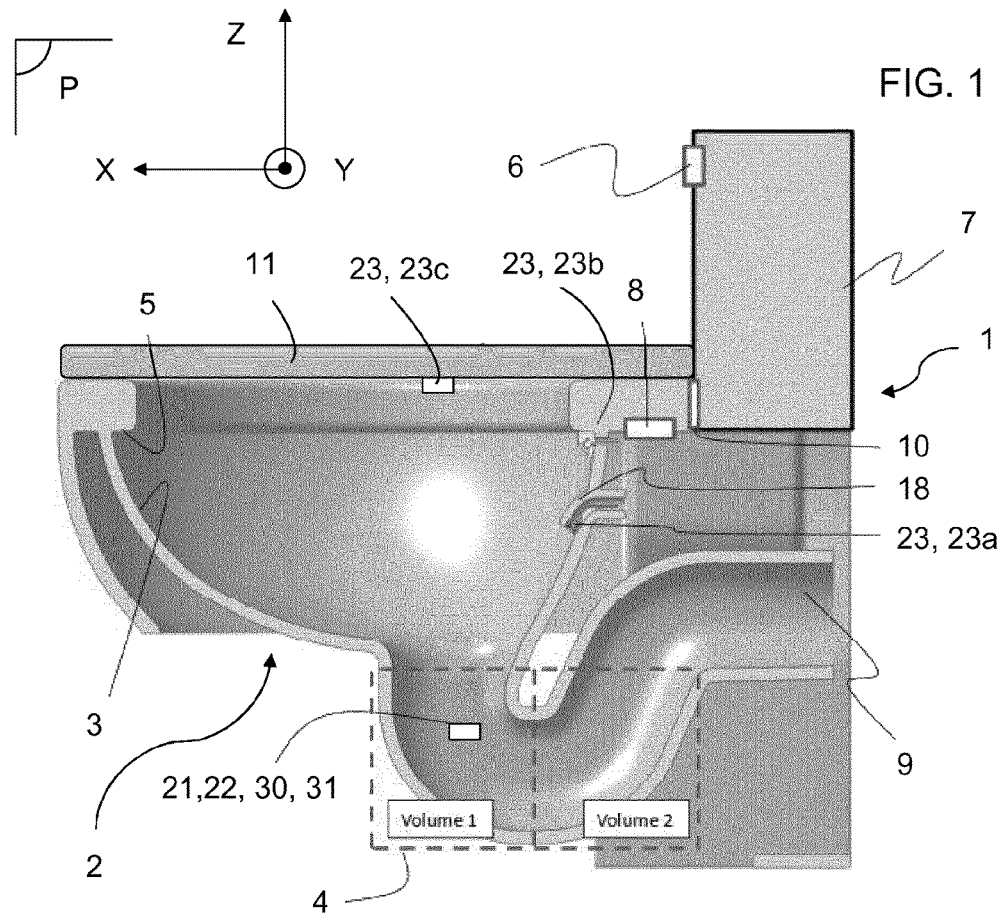
FIG. 1 is a cross-sectional schematic side view of a toilet according to an embodiment of the present invention.

FIG. 1 shows a cross sectional image of a toilet 1. The toilet 1 comprises a toilet bowl 2 including:
  a receptacle portion 3 (dry portion) which is the part of the toilet bowl 2 that can receive excrements but does not typically contain water (except during a flush);
  and a bowl portion 4 (wet portion), illustrated in FIG. 1 by a dashed-line box.

In FIG. 1 are shown the longitudinal axis X, lateral axis Y, and vertical axis Z, as well as the vertical longitudinal median plane P of the toilet bowl 2.

As shown in FIG. 1, In the bowl portion 4, volume 1 is defined by the bottom inside portion of the toilet bowl 2 that can typically contain water and be essentially visible to a user of the toilet 1 (see left side dashed-line box). Volume 2 is also at the inside bottom portion of the toilet bowl 2 and typically contains water but is not visible to a user of the toilet 1 (see right side dashed-line box).

The toilet bowl 2 of toilet 1 has a receptacle flange 5 and can be closed by a lid 11.

The toilet 1 is further equipped with a water supply device, here a water tank 7, that delivers a certain volume of water in order to evacuate the waste contained in the toilet bowl 2 by an outflow conduit 9. A flusher 6 enables a user to manually actuate the water tank 7.

According to the invention, the toilet comprises a water-saving system. Said system includes a controller 8 which can actuate a flush volume actuator 10 for flushing a variable volume of water as a function of the waste level in the toilet bowl 2.

According to an embodiment of the invention, the water-saving system further comprises a first emitter 21 for emitting a first beam having a first wavelength $\lambda 1$ and a second emitter 22 for emitting a second beam having a second wavelength $\lambda 2$. At least one detector, and preferably two detectors 30, 31 are provided to receive said first and second beams.

The first emitter 21, second emitter 22 and the detectors 30, 31 are installed on the toilet 1 such that the first beam and second beam pass through the water contained in the toilet bowl 2 before being received by the detectors 30, 31. The controller 8 receives the data from said detectors 30, 31 and processes it, and actuates the flush volume actuator 10 as a function of said data. Said data represents the waste level in the toilet bowl 2, as the intensity received by the detectors 30, 31 depends on the nature of the medium through which the beam passes (urine concentration), and on the elements contained in said medium (feces and paper). As a result, the volume of water is adapted to the waste level in the toilet bowl 2, so as to minimize said volume of water.

According to this embodiment, the first and second wavelengths $\lambda 1$, $\lambda 2$ are both in the visible spectrum and are distinct.

More precisely, the first emitter 21 can emit in the blue region of the visible spectrum, $\lambda 1$ being around 465 nm, while the second emitter 22 can emit in the orange region of the visible spectrum, $\lambda 2$ being around 595 nm.

According to an embodiment, there is provided a third emitter 23 for emitting a third beam having a third wavelength $\lambda 3$, the third emitter 23 being installed on the toilet 1 such that the third beam passes through the water contained in the toilet bowl 2 before being received by the detectors 30, 31.

The third emitter 23 can emit in the visible spectrum, more precisely either in the blue region of the visible spectrum ($\lambda 3$ being around 465 nm) or in the orange region of the visible ($\lambda 3$ being around 595 nm).

The first emitter 21, second emitter 22 and third emitter 23 are typically light emitting diodes (LED).

Figure 2:
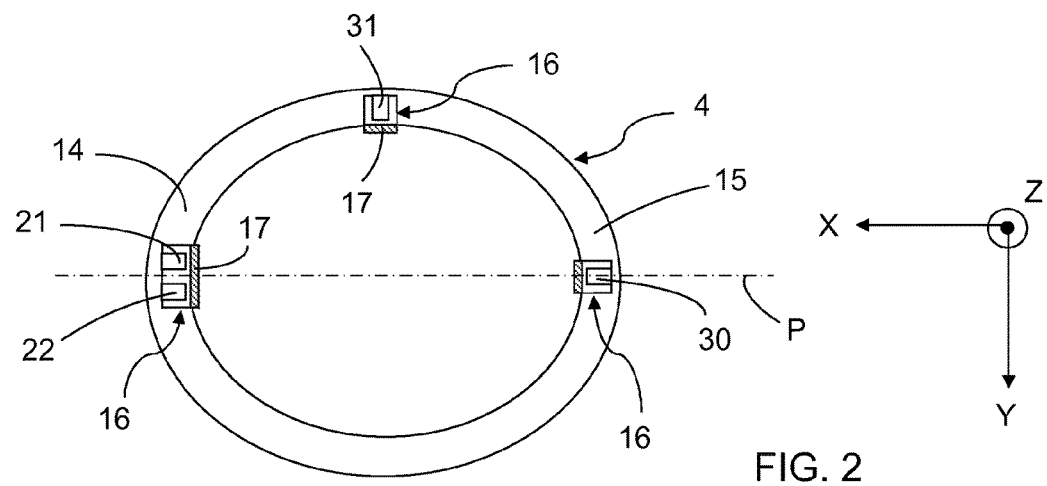
FIG. 2 is a cross-sectional schematic horizontal view of a toilet according to an embodiment of the present invention.

As shown in FIG. 2, the emitters and detectors can be arranged as follows:
  the first and second emitters 21, 22 can be located on a wall 14 of the bowl portion 4 substantially adjacent one another, and arranged to emit beams towards the opposite wall 15 of the bowl portion 4 along a beam direction which, here, is the longitudinal direction X;
  one detector 30 is arranged in the bowl portion 4 on said opposite wall 15 of the bowl portion 4 and is substantially aligned with the emitters 21, 22 along the beam direction X;
  another detector 31 is arranged on a wall of the bowl portion 4 and is angularly offset from the emitters 21, 22 by an angle of around 90°.

In the embodiment illustrated in FIG. 2, the emitters 21, 22 and the detectors 30, 31 are installed in a hole 16 arranged in the toilet bowl 2, said hole 16 having an opening facing the inside of the toilet bowl 2. A protective wall 17 is secured to the toilet bowl 2, in water-tight fashion, to close said opening and therefore protect the emitters and detectors. The protective wall 17 is made of a material allowing the emission or reception of the beams emitted by the emitters. The protective wall 17 can be made of a material that can resist temperatures up to 1200°, so that the emitters and detectors can be present from the beginning of the toilet bowl molding without being damaged. Thanks to the protective wall 17, cleaning is easier, and the emitters/detectors are more durable.

The third emitter 23 can also be located in the bowl portion 4.

Alternatively, as shown in FIG. 1, the third emitter 23 can be located outside the bowl portion 4. It can be located on a piece attached to the toilet bowl 2, such as the lid 11 (position 23*c*), or in the receptacle portion 3, for example in the vertical longitudinal median plane P of the toilet bowl 2. In FIG. 1 are illustrated two possible positions of the third emitter 23 in the receptacle:

- a first position (position 1, 23*a*), where the third emitter 23 is arranged under an emitter adapter 18 which can be manufactured with the ceramic of the receptacle portion 3, or which can be a separate piece fastened to the receptacle portion 3. With this implementation, the third emitter 23 is hidden from a user of the toilet 1 but can function properly;
- a second position (position 2, 23*b*), where the third emitter 23 is placed under the receptacle flange 5. In this position, the third emitter 23 is also hidden from a user.

Of course, other implementations of the emitters/detectors can be envisaged.

Figure 3:
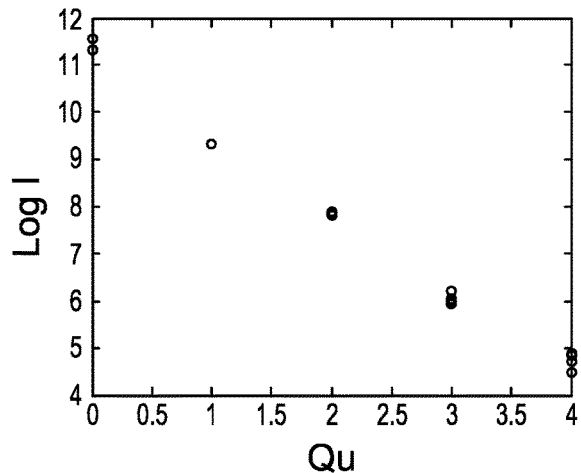
FIG. 3 is graph showing the absorption in the blue region (Log of intensity received by a photodiode arranged at 90° C. from the emitter) as a function of the quantity of urine in the toilet bowl.
Figure 4:
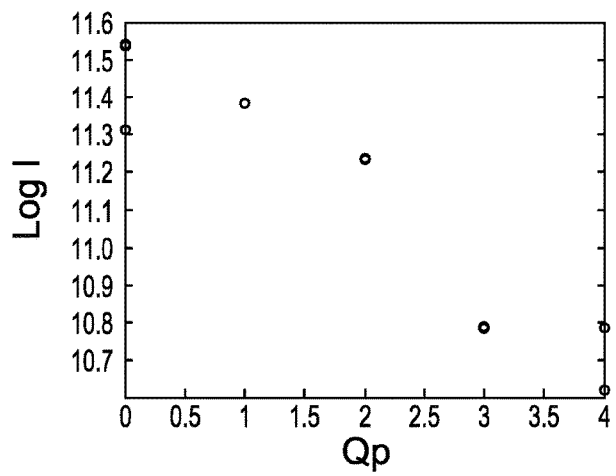
FIG. 4 is graph showing the absorption in the blue region (Log of intensity received by a photodiode arranged at 90° C. from the emitter) as a function of the quantity of paper in the toilet bowl.
Figure 5:
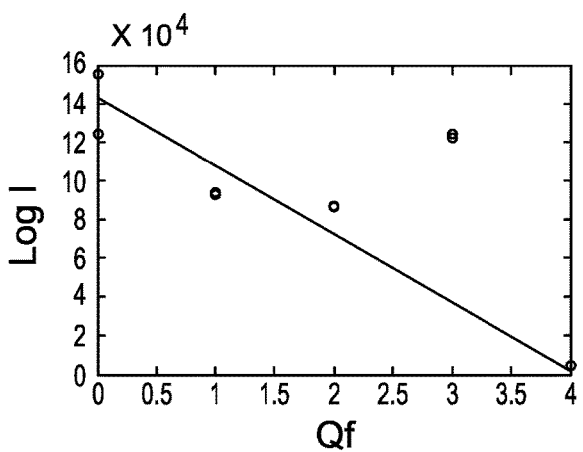
FIG. 5 is graph showing the absorption in the blue region (Log of intensity received by a photodiode arranged at 90° C. from the emitter) as a function of the quantity of feces in the toilet bowl.

Reference is now made to FIGS. 3, 4 and 5 which show the efficiency of waste level detection with a LED emitting in the blue region of the visible spectrum.

FIG. 3 represents the Log of intensity (Log I) received by a photodiode arranged at 90° C. from said LED (such as the detector 31 of FIG. 2 receiving the beam emitted by the first emitter 21) as a function of the quantity of urine (Qu) in the toilet bowl 2. Similarly, FIG. 4 represents the Log of intensity (Log I) received by a photodiode arranged at 90° C. from said LED as a function of the quantity of paper (Qp) in the toilet bowl 2. And FIG. 5 represents the Log of intensity (Log I) received by a photodiode arranged at 90° C. from said LED as a function of the quantity of feces (Qf) in the toilet bowl 2. Five levels of Qu (urine concentration), Qp (number of paper sheets) and Qf (number of feces) have been considered, between 0 and 4.

As can be seen, there is a strong correlation between Qu—or Qp or Qf—and Log I, meaning that using a LED emitting in the blue region ensures a good evaluation of the waste level in the toilet bowl 2, at least with regard to urine, paper, and feces, making it possible to properly adjust the flush volume.

Tests have been conducted in 125 situations corresponding to various combinations between:

- five levels of paper: from 0 to 4 papers;
- five levels of feces: from 0 to 4 feces;
- and five levels of urine concentration: from 0 to 4 (increasing concentrations).

For each of these 125 situations, the appropriate flush volume V has been theoretically determined, between 13 possible volumes (0; 0.5; 1; 1.5; 2; 2.5; 3; 3.5; 4; 4.5; 5; 5.5; 6 l). Moreover, the real flush volume delivered in response to the data received by the detectors has been recorded.

The below tables show the results obtained from these tests.

A given column corresponds to a volume V that was theoretically determined as necessary given the waste level. In said column, the number in one cell indicates the number of tests that led to the volume of flush water indicated in the corresponding line. For clarity reasons, the figure "0" has been replaced by "-".

For example, in table 1, in the column V=2 l: for 17 tests, 2 l were delivered by the water-saving system, for 1 test, 3 l were delivered, for 4 tests, 4 l were delivered, and for 3 tests, 4.5 l were delivered.

Thus, an efficient water-saving system leads to low figures in the cells which are not in the diagonal of the table.

Table 1 below was obtained with a first emitter 21 ($\lambda 1$ around 465 nm) and a second emitter 22 ($\lambda 2$ around 595 nm) both located in the bowl portion 4, and detectors 30, 31 arranged as shown in FIG. 2. Such an embodiment makes it possible to efficiently clean the toilet 1 with three possible volumes of flush water (i.e. low, medium and high).

TABLE 1

| V   | 0 | 0.5 | 1 | 1.5 | 2  | 2.5 | 3  | 3.5 | 4 | 4.5 | 5  | 5.5 | 6  |
|-----|---|-----|---|-----|----|-----|----|-----|---|-----|----|-----|----|
| 0   | 5 | —   | — | —   | —  | —   | —  | —   | — | —   | —  | —   | —  |
| 0.5 | — | 5   | — | —   | —  | —   | —  | —   | — | —   | —  | —   | —  |
| 1   | — | —   | 0 | —   | —  | —   | —  | —   | — | —   | —  | —   | —  |
| 1.5 | — | —   | — | 5   | —  | —   | —  | —   | — | —   | —  | —   | —  |
| 2   | — | —   | — | 5   | 17 | —   | 14 | 5   | 6 | 11  | 2  | —   | —  |
| 2.5 | — | —   | — | —   | —  | 10  | 2  | —   | — | —   | —  | —   | —  |
| 3   | — | —   | 5 | —   | 1  | 1   | 8  | —   | — | —   | —  | —   | —  |
| 3.5 | — | —   | — | —   | —  | —   | —  | 5   | — | —   | —  | —   | —  |
| 4   | — | —   | — | —   | 4  | —   | 1  | —   | 8 | —   | 2  | —   | —  |
| 4.5 | — | —   | — | 5   | 3  | 9   | 9  | 4   | 5 | 17  | 3  | —   | —  |
| 5   | — | —   | — | —   | —  | —   | 6  | 1   | 6 | 7   | 17 | 11  | —  |
| 5.5 | — | —   | — | —   | —  | —   | —  | —   | — | 5   | 16 | 23  | 13 |
| 6   | — | —   | — | —   | —  | —   | —  | —   | — | —   | —  | 1   | 2  |

Table 2 below was obtained with a first emitter 21 ($\lambda 1$ around 465 nm), a second emitter 22 ($\lambda 2$ around 595 nm) both located in the bowl portion 4, a third emitter 23 ($\lambda 3$ around 465 nm) located in the upper part of the receptacle portion 3 (for example at 23*a*, 23*b* or 23*c* in FIG. 1), and detectors 30, 31 arranged as shown in FIG. 2. Such an embodiment makes it possible to efficiently clean the toilet 1 with six possible volumes of flush water, which is better in terms of water saving.

TABLE 2

| V   | 0 | 0.5 | 1 | 1.5 | 2 | 2.5 | 3 | 3.5 | 4 | 4.5 | 5 | 5.5 | 6 |
|-----|---|-----|---|-----|---|-----|---|-----|---|-----|---|-----|---|
| 0   | 5 | —   | — | —   | — | —   | — | —   | — | —   | — | —   | — |
| 0.5 | — | 5   | — | —   | — | —   | — | —   | — | —   | — | —   | — |
| 1   | — | —   | 5 | —   | — | —   | — | —   | — | —   | — | —   | — |

TABLE 2-continued

| V | 0 | 0.5 | 1 | 1.5 | 2 | 2.5 | 3 | 3.5 | 4 | 4.5 | 5 | 5.5 | 6 |
|---|---|-----|---|-----|---|-----|---|-----|---|-----|---|-----|---|
| 1.5 | — | — | — | 8 | — | — | — | — | — | — | — | — | — |
| 2 | — | — | — | — | 19 | — | — | — | — | 1 | — | — | — |
| 2.5 | — | — | — | — | — | 10 | 1 | — | — | — | — | — | — |
| 3 | — | — | — | 1 | 1 | — | 22 | — | — | — | — | — | — |
| 3.5 | — | — | — | — | — | — | — | 9 | — | — | — | — | — |
| 4 | — | — | — | — | — | — | — | — | 19 | 1 | — | — | — |
| 4.5 | — | — | — | 6 | 5 | 10 | 17 | 6 | 5 | 27 | 3 | — | — |
| 5 | — | — | — | — | — | — | — | — | 1 | 11 | 25 | 8 | — |
| 5.5 | — | — | — | — | — | — | — | — | — | — | 11 | 27 | 6 |
| 6 | — | — | — | — | — | — | — | — | — | — | 1 | — | 9 |

Table 3 below was obtained with a first emitter 21 (λ1 around 465 nm), a second emitter 22 (λ2 around 595 nm) both located in the bowl portion 4, a third emitter 23 (λ3 around 595 nm) located in the upper part of the receptacle portion 3 (for example at 23a, 23b or 23c in FIG. 1), and detectors 30, 31 arranged as shown in FIG. 2. Such an embodiment makes it possible to efficiently clean the toilet 1 with six possible volumes of flush water, which is better in terms of water saving.

TABLE 3

| V | 0 | 0.5 | 1 | 1.5 | 2 | 2.5 | 3 | 3.5 | 4 | 4.5 | 5 | 5.5 | 6 |
|---|---|-----|---|-----|---|-----|---|-----|---|-----|---|-----|---|
| 0 | 5 | — | — | — | — | — | — | — | — | — | — | — | — |
| 0.5 | — | 5 | — | — | — | — | — | — | — | — | — | — | — |
| 1 | — | — | 5 | — | — | — | — | — | — | — | — | — | — |
| 1.5 | — | — | — | 13 | — | 1 | — | — | — | — | — | — | — |
| 2 | — | — | — | — | 19 | — | — | 1 | 5 | — | — | — | — |
| 2.5 | — | — | — | — | — | 12 | 1 | — | — | — | — | — | — |
| 3 | — | — | — | 2 | — | 2 | 35 | — | 1 | — | — | — | — |
| 3.5 | — | — | — | — | — | — | — | 10 | — | — | — | — | — |
| 4 | — | — | — | — | — | — | — | — | 14 | 1 | — | — | — |
| 4.5 | — | — | — | — | 6 | 5 | 4 | 4 | 5 | 34 | 2 | — | — |
| 5 | — | — | — | — | — | — | — | — | 1 | 4 | 28 | 11 | 1 |
| 5.5 | — | — | — | — | — | — | — | — | — | — | 10 | 24 | 5 |
| 6 | — | — | — | — | — | — | — | — | — | — | — | — | 9 |

As the emitters and detectors enable to quantify and qualify the waste, the invention makes it possible to adjust the volume of flush water to the waste level in the toilet bowl, automatically, i.e. without requiring the user's decision. It has proved to be much more effective in terms of water saving, insofar as it is not always clear for the user which quantity of water would be necessary to clean the toilet, which results in the user most often deciding to choose a flush volume higher than necessary.

Owing to the invention, it is expected that the water volume used for flushing the toilets can be decreased by at least 50%.

Reference is now made to FIGS. 6 to 12. It has to be noted that in the following description related to these figures:
the UV emitter can be replaced by a visible emitter capable of emitting in the visible region of the spectrum. In other words, the term "UV emitter" in the following description has to be considered as an emitter capable of emitting either in the UV region of the spectrum or in the visible region. For example, the wavelength of the beam emitted by this emitter (UV or visible emitter) can be comprised between 300-495 nm, i.e. in the UV region or in the visible region (violet or blue);
the IR emitter can be replaced by a visible emitter capable of emitting in the visible region of the spectrum. In other words, the term "IR emitter" in the following description has to be considered as an emitter capable of emitting either in the IR region of the spectrum or in the visible region. For example, the wavelength of the beam emitted by this emitter (IR or visible emitter) can be comprised between 590-900 nm, i.e. in the IR region or in the visible region (orange or red).

According to an embodiment, the invention allows to simultaneously detect the presence of soluble contaminants (such as urine) using UV radiation and solid contaminants (such as toilet paper and feces) using visible or infrared radiation in the toilet bowl and to adjust/minimize the volume of water required for efficient flushing based on detected radiation.

The ultraviolet optical source can emit at approximately 350 nm or any wavelength in the UV band where urine has a strong absorption peak. In a preferred embodiment, there is provided one UV source/emitter 41 at 370 nm and two detectors (1 UV 50 and the other 51 either "passive" visible or IR). The passive visible or infrared sensor 51 is configured to receive radiation from the toilet bowl 2 and above and can be used to detect variations in the content (feces or toilet paper) of the toilet bowl 2 and/or detect movement of a person. Infrared sensors are known in the art for detecting the presence of users but they are not typically located inside the toilet bowl or near the upflow-outlflow conduit for detecting solid contaminants.

Infrared radiation allows to determine the presence of solids (toilet paper, feces) in the toilet bowl 2. The infrared device can be equipped with an infrared emitter 42 to emit IR radiation such as 880 nm but this is not absolutely necessary, the system can also work with natural radiation if a more sensitive detector is provided.

Ultraviolet radiation allows to determine the presence (and concentration) of urine efficiently because urine absorbs UV radiation. The device is equipped with a UV emitter and a UV detector disposed opposite (facing) each other. When using relatively weak UV emitters, alignment of the emitter/detector pair is important to maximize detected signal from the emitter.

It will be appreciated that the detectors 50, 51 (UV and IR) are preferably located in the bowl portion 4 and more preferably in Volume 2 which can correspond to the wet portions of the sump or siphon, while the emitters 41, 42 can be either in the bowl portion 4 or receptacle portion 3 or anywhere else, as long as the radiation emitted passes through a portion of the toilet water before.

Applicant's experiments have shown that detection is more efficient when the UV detector 50 is located in Volume 1 than in Volume 2. This is simply due to the fact that urine falls first into Volume 1 and represents the time required for proper mixing of both volumes to reach an equilibrium such that the concentration of urine is the same in both Volumes 1 and 2.

However, in some embodiments, it may be advantageous to nevertheless provide the emitters 41, 42 and detectors 50, 51 in Volume 2 because such a location allows them to be hidden from the user of the toilet 1. When the emitters 41, 42 and detectors 50, 51 are located in Volume 2, a mixer can be added to the bowl portion 4 in order to speed up the equilibrium process and/or more powerful emitters can be used. An obvious disadvantage of the emitter/detector in Volume 2 is that it's accessibility for manual cleaning is significantly reduced. This shortcoming can be overcome by providing cleaning jets (described in more detail below).

Solid contaminant detection can be performed by an infrared detector without an infrared emitter. However, having an infrared emitter allows to have a proper and stable baseline reading that could not be possible using natural lighting/radiation as an "emitter". Fluctuations in the intensity of the signal amplification circuit would cause a significant increase in processing complexity.

Figure 7A:
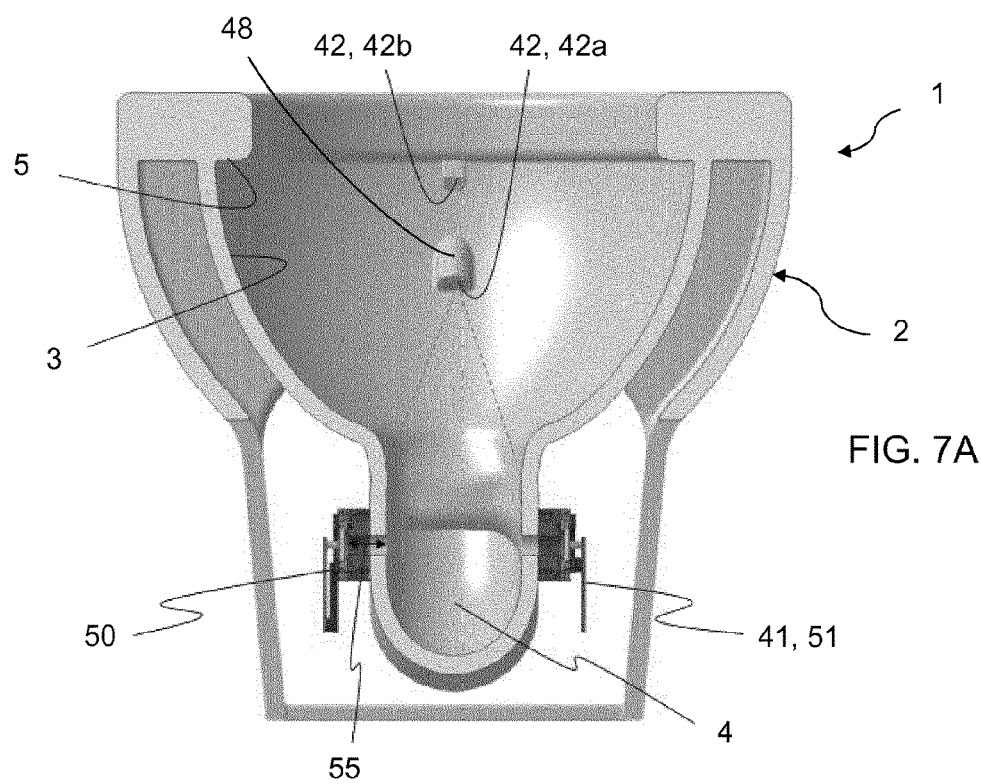
FIGS. 7A and 7B are cross-sectional front views of the receptacle/bowl portion, respectively where the recess/optical devices are visible, and where the ceramic portion has been modified (by an emitter/detector adapter) to hide the recess/optical devices.
Figure 7B:
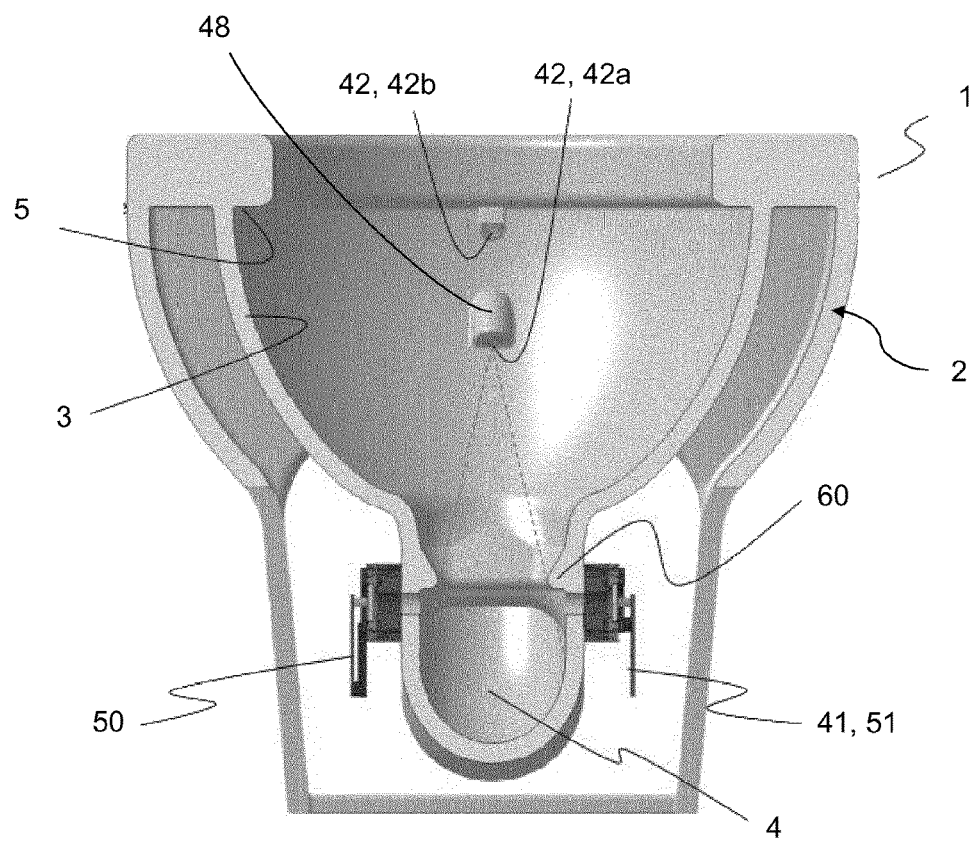
Figure 8:
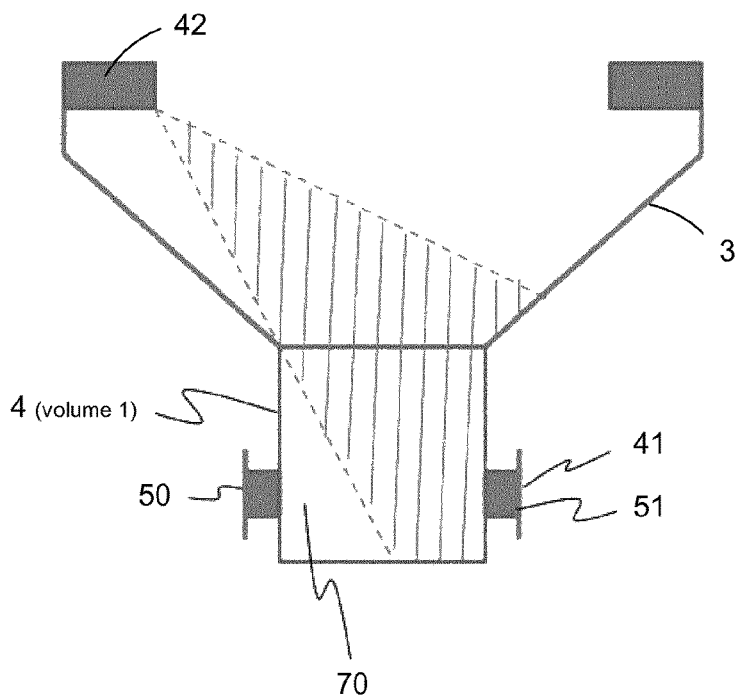
FIG. 8 is a cross-sectional front view drawing of an embodiment of the present invention, showing the IR or visible emitter at a lateral location on the receptacle flange 5 in a direct line-of-sight with the IR or visible detector but also creating a dark zone.
Figure 10:
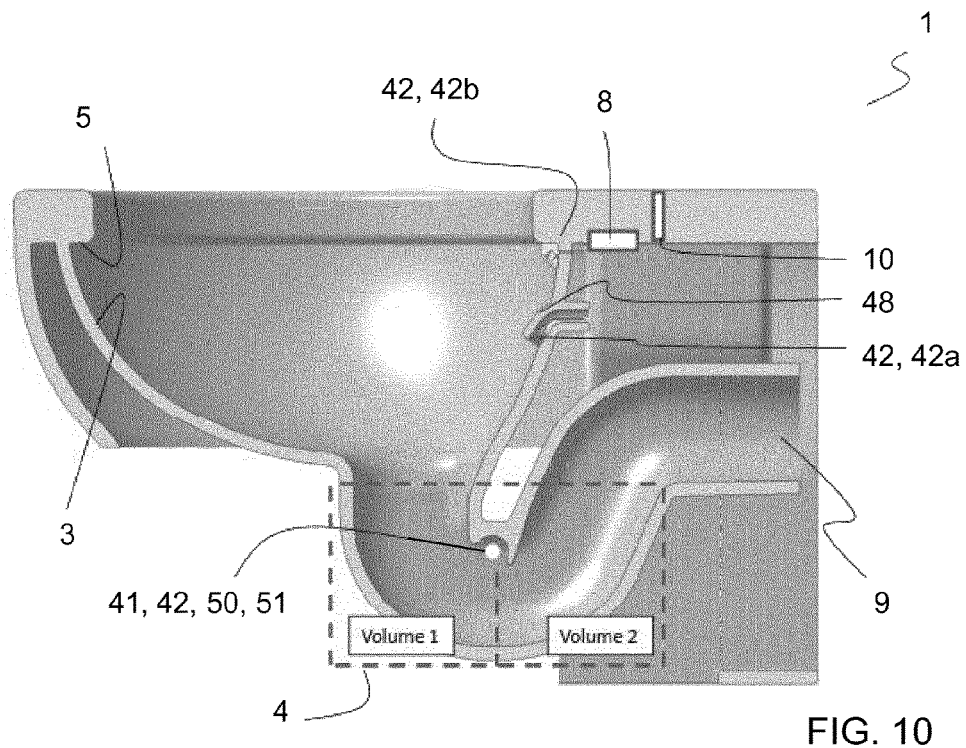
FIG. 10 is a cross-sectional schematic side view of a toilet according to an embodiment of the present invention, where the optical devices are located near an upper junction point between Volume 1 and Volume 2.

In order to hide the emitter from a user of the water-saving toilet 1, the ceramic of the receptacle portion 3 can comprise (be manufactured with) a bump 48, under which the emitter can be placed (FIGS. 7A, 7B, and 10 at position 1, 42*a*). In such a configuration, the emitter can function properly without being seen by the user. Other ways to hide the emitter from the user without affecting the ceramic manufacturing process is to provide an IR emitter adapter, which can be combined to the emitter (or not) and placed through an aperture of (or secured to) the receptacle portion 3 of the toilet 1. The line-of-sight of the emitter is preferably oriented to emit in the direction of the bowl portion 4, where the detectors 50, 51 are typically located.

Alternatively, the IR emitter 42 can be conveniently placed under the receptacle flange 5 shown in FIGS. 7A, 7B and 10 at position 2 (42*b*), where it is both out of sight, and properly angled with respect to the detector.

In operation, the water saving toilet system can work in the following way: As a user uses the toilet 1 in its intended way, urine and feces end up mostly in the bowl portion 4 made up of Volume 1 and Volume 2. When the user is finished using the toilet 1, he actuates a flusher 6 which initiates an emptying of a water tank 7. The volume of flushed water is determined by a controller 8, having processed data received from the detectors (UV and IR), either upon initiation of flushing or during a reading(s) taken before flushing, and determined either the presence or concentration or quantity of various contaminants. The volume of water is flushed from the water tank 7, passes through the receptacle flange 5 and then onto the receptacle portion 3 before ending up in the bowl portion 4, having washed away any remaining contaminants on the receptacle portion 3 (dry portion).

The controller 8 receives and processes data from the detectors in order to determine the flush volume required for efficient flushing based on the detected contaminants. As a function of said data, the controller 8 actuates a flush volume actuator 10 for flushing an appropriate volume of water. In some embodiments, when the IR signal is above a certain threshold (meaning that no solid contaminant has been detected), the UV signal will be solely responsible for determining the flush volume of water. However, when the IR signal is below that threshold, only IR will be used to determine flush volume as UV may already be saturated (see next paragraph for explanation). In some embodiments, the IR emitter can use at least two power levels. The first level is of lower power and for detecting toilet paper while the second level is of higher power and for detecting feces.

Data from the UV detector 50 allows to generate a UV curve from the detected UV signal intensity, which can then be converted to urine concentration. Applicants have found that the UV signal will saturate when solid matter is between the emitter and detector, explaining why, in some embodiments, it is useful to place the recess/apertures at or near the bottom of the toilet bowl 2, out of the way of floating toilet paper or feces. For example, a detected urine concentration below a predetermined threshold will be considered a "low concentration" urine and require a flush volume of 1 liter while a detected urine concentration above that threshold will be considered a "concentrated" urine and require a 3 liter flush volume. It will be understood that any "program" following the above principle should be considered as part of the invention.

Data from the IR detector 51 allows to generate an IR curve from the detected IR signal intensity. IR data will be processed to determine a quantity of solid contaminants. For example, as mentioned above, an IR emission at a first power level is for determining toilet paper quantity and an IR emission at a second level (more powerful signal) is for determining a quantity of feces. The data from the IR determination can be added onto (or not) the flush volume from the UV detector 50. For example, a concentrated urine may require a 3 L flush volume and one unit of detected toilet paper may require an additional 1 L flush volume for a total flush volume of 4 L for the detected solid and liquid contaminants.

It will be appreciated that although FIG. 1 shows a traditional type of toilet 1, any other type of toilet can be adapted to function with the water saving system described herein. For example, there is no need for a physical actuator to be actuated by a user but flushing can rather be actuated automatically by various sensors. In addition, there is no requirement for a water tank as the volume of flush water can be controlled by a valve or the like.

The water—saving system for toilets can be equipped with an optional IR emitter and an IR detector as well as a UV emitter/detector pair. To prevent or minimize dirtying/fouling problems with the optical windows 54 of the emitter/detectors, it has been found advantageous to provide a recess 55 within the toilet bowl 2 and to place the optical devices (emitters and detectors) at the end of such a recess 55. In this configuration (see FIG. 6), the optical window 54 that would be in contact with contaminants present inside a toilet bowl 2 are recessed away from the inner surface of the toilet bowl 2 in order to prevent direct exposure to the more voluminous contaminants (they cannot enter the recess). The recess 55 allows contaminants to be kept away from the optical window while radiation from emitters, if properly aligned, passes efficiently from the emitter to the detector. The depth of the optical window/lens with respect to the inner surface of the toilet bowl 2 is composed of the thickness of the ceramic toilet bowl 2 and the thickness of the Recess part 55 (see arrow inside left side recess of FIG. 7A).

Figure 6:
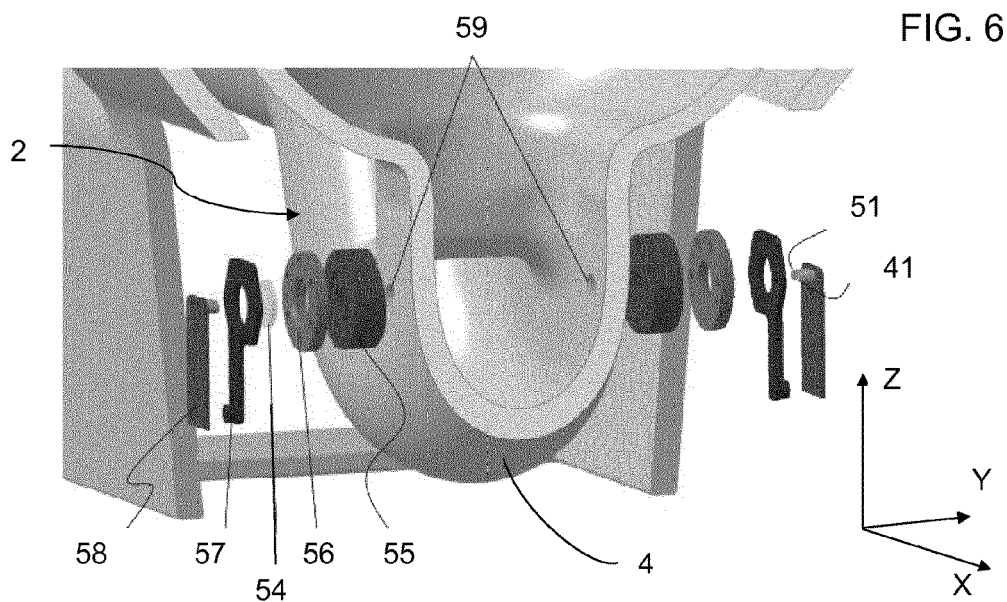
FIG. 6 is an exploded perspective view of opposed and aligned optical devices (emitter and/or detector pairs) according to an embodiment of the present invention.

The optical device 69 comprises all the elements involved in detecting the presence of contaminants and includes elements such as the Recess, the Window/lens holder 56, the printed circuit board (PCB) holder 57 and the PCB 58 itself which comprises one or more of the UV emitter 41, the UV detector 50, the IR emitter 42 and the IR detector 51 (as shown in FIG. 6). In some embodiments, the IR detector 51 is mounted on the same (PCB) as the UV emitter 41 while the UV detector 50 is on another PCB. It would be possible to have a recess 55 for each emitter and detector but this would require more apertures 59, labor, and material, thus increasing cost.

FIG. 6 shows an embodiment of the optical device 69 for providing recessed UV or IR or visible emitters or detectors. The device can comprise a recess 55 which is used to cover an aperture 59 made in the ceramic of the toilet bowl 2 and to receive the detectors emitters. The recess 55 creates an open-ended outwardly extending element which recesses (moves rearward) the optical devices (emitters 41, 42, detectors 50, 51). The recess part can be of cylindrical shape with a hole in the middle where the length of the cylinder determines the depth of the recess 55 (when added to the thickness of the bowl). If a separate window 54/lens holder 56 is provided, an o-ring needs to be placed between the recess 55 and PCB holder 57. In some embodiments, the recess and window/lens holder are combined into one part/element. The PCB 58 is mounted on a PCB holder 57 and secured to the other elements to provide a water-tight fit.

It will be appreciated by those skilled in the art that the cutaway view shown in FIG. 6 shows a portion of the ceramic toilet bowl 2 having two recesses 55 on opposite sides of the lower inner portion of the toilet bowl 2. In other embodiments an extra element (not shown) can secure all parts/elements together in order for the optical devices 69 to be attached to the toilet bowl 2 "en bloc". It is understood that this extra element is adapted for each and every different kind of toilet bowl 2 in order to provide good fit.

A water saving system for toilets according to the present invention can be retrofitted onto an existing toilet. In such system, the recess is provided by making a aperture in the ceramic portion of the toilet bowl 2 at a location found in Volume 1 or Volume 2 and securing in water-tight fashion an element having a thickness that allows to move the emitters and detectors outwardly and away from the normal flow of contaminants, thus protecting them from fouling and contaminating radiation.

In other embodiments, the water-saving system can be added to a toilet that has been manufactured to receive such as system. In such an embodiment, the ceramic portion of Volume 1 and/or Volume 2 is modified to create an open-ended outwardly extending ceramic recess of the desired length, the outward end aperture for receiving the emitter and/or detector in water-tight fashion. It will be appreciated that any (UV or IR or visible) emitters and detectors as well as any method of securing these optical devices to the toilet bowl 2 should be considered as covered under the present invention. The methods include but are not limited to flanging, gluing, moulding, fastening, screwing, bolting, squeeze fitting, etc.

In some embodiments, the length of the recess 55 is about 2 cm. It will nevertheless be understood that the recess can be more or less than 2 cm, for example, the recess is preferably between 0.5 and 5.0 cm. A person of skill in the art, in light of the description provided herein, would understand that the purpose of the recess is to provide an optical window for emitters and detectors that is not in the direct path of solid contaminants (mainly feces) found in the toilet bowl 2. The recess can also serve to shield the detectors from unwanted/contaminating radiation that may reach the detector, if it were not recessed from "direct light". This is especially true when the emitters/detectors are located in Volume 1.

Placing the detector at the outward end of the recess has several advantages as described above but also critically requires that a proper alignment of the emitter/detector pair be performed or built into the system. Without such an alignment, detection efficiency would be greatly reduced.

In a newly manufactured toilet according to the present invention, the wet portion of a toilet bowl 2 or outflow conduit 9 (also known as the siphon, the s-trap or p-trap) can be manufactured/configured with a built-in recess to receive the optical devices such as source/emitter and sensor/detector at opposite ends thereof.

Applicant's experiments have shown that location of the IR emitter 42, or rather the relative location between the emitter and detector in the toilet 1, affects signal quality. For example, it is advantageous to place the IR emitter 42 on the upper surface of the toilet receptacle portion 3, near the seat (shown as positions 1 (23*a*, 42*a*) and 2 (23*b*, 42*b*) in FIGS. 1, 7A, 7B and 10). In this configuration, the emitter and detector are not aligned. Indeed, there is provided a 90° angle between the direct line-of-sight of the emitter and that of the detector. In other words, if the IR emitter 42 is located at the center of the bowl, as shown in FIGS. 1 and 7A, 7B and 10 has a line-of-sight along a longitudinal axis X of the toilet 1, the IR detector 51 would have a line-of-sight along a lateral axis Y of the toilet 1 that goes into and out of the drawing of FIG. 1 and from side to side of the drawing in FIGS. 7A, 7B. The lines-of-sight for the IR devices are thus perpendicular to each other.

In such a configuration, the intensity of the IR emitter 42 must be strong enough to reach a recessed detector. The IR reflective properties of ceramic will contribute to the IR signal detected by the detector inside the recess 55.

In other optical configurations (shown in FIG. 8), the IR emitter can be located on one lateral side of the toilet 1 either under the receptacle flange 5 or the receptacle portion 3 itself, and the IR detector can be located on an opposite side of the toilet bowl portion 4, in order to be in a direct line-of-sight of the emitter (both emitter and detector have a line-of-sight in a lateral axis/orientation). This can be advantageous in some situations but creates a dark zone 70 to which the system is insensitive for solid contaminant determination.

If lower cost emitters are used in the manufacture of water-saving systems for toilets according to present invention, emitter power is sacrificed and alignment of the emitter recess optical window with the detector recess optical window becomes critical. Applicant provides a tool for aligning the windows during the manufacture or retro-fitting processes. This is true for both the UV and IR radiation.

When the recesses 55 for emitters/detectors are located in Volume 1, certain components of the optical devices of the water saving system are visible to the user. It may sometimes be advantageous to hide these components. In such situations, the lower water containing portion of the ceramic toilet bowl (known as Volume 1) can be slightly modified such that the recess apertures are not seen by the user of the toilet 1. FIG. 7A shows an embodiment having recesses 55 that are or can be visible to a user of the toilet 1 while FIG. 7B shows another embodiment comprising a modification to the ceramic portion of Volume 1 for the purpose of hiding the recesses. It will be appreciated that the recess apertures can be hidden by emitter adapters 60 (such as those shown in FIG. 1) which can be secured to the bowl portion 4 or can fit with the optical devices into the "recess" aperture, as long as the emitter/detector adapters 60 don't interfere with the signal detected by the detectors 50, 51.

Figure 9:
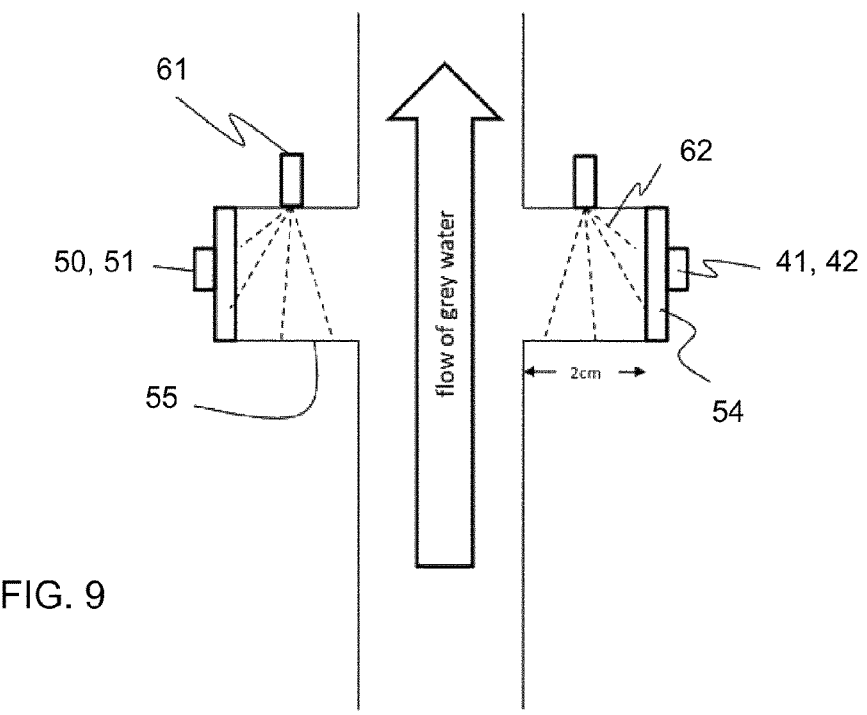
FIG. 9 shows a highly schematic cross-sectional view of recessed optical windows for the emitter/detector pair and a cleaning jet system to prevent fouling of the windows.

Applicants have found that even if recessed optical windows are provided, they may nevertheless become fouled. For this reason, some embodiments of the present invention comprise a cleaning device 61 advantageously incorporated into the recess 55, as shown in FIG. 9. The recess 55 can thereby be adapted to receive a cleaning device 61 comprising a fluid jet for spraying a "cleaning fluid" 62 onto the optical window 54 to clean the window. The cleaning device can comprise a nozzle that uses water from the reservoir and sprays it onto the optical window 54. A cleaning jet can also be used for renewing/flushing the volume of "dead" water found in the recess 55.

In other embodiments, the fluid jet nozzle simply sprays air onto the optical window 54 and this is sufficient to clean the window due to the presence of liquid in and around the recess 55 (i.e. the normal volume of water present inside the toilet bowl 2). In other embodiments, a pump can be provided in conjunction with the recess in order to force a circulation of water in the recess volume, thereby renewing the volume and cleaning the optical window 54.

In yet other embodiments, the optical window 54 is manufactured from or coated with a material that prevents fouling by means such as decreasing surface tension or adherence to the window.

In some embodiments, the optical window 54 can comprise a convex or focusing lens in order to maximize capture and concentrate incident radiation onto the detector. The lens can have a diameter of 1 cm but in any configuration, the radiation focal point with respect to the PCB/detector requires, for example, adjusting a thickness of the PCB holder 57.

In some embodiments, the optical window 54 can be covered by an aperture cover, such as a check valve (or clapet) that is designed to be in a closed position when the optical devices are idle and in an open position when the optical devices are emitting or detecting, thereby decreasing the overall fouling of the optical windows 54. The aperture cover can be opened by a linear actuator or can be rotated away from the aperture cover.

In other embodiments, the controller 8 of the water saving system for toilets is configured to determine a level of fouling/dirtying of the optical windows. Baseline UV and IR data/values are taken and kept in a memory (either after a routine flush or at a time when no contaminant is detected in the toilet bowl 2). When these baseline values fall below a certain threshold, the controller 8 activates an indicator (sound or visual signal) which tells the user to clean/attend to the optical windows 54 or activates an automated cleaning cycle using cleaning jets.

Some advantages of the present water—saving toilet invention include:
1. Saving water by adjusting flush volume as a function of excrement type (urine, feces);
2. Saving water by adjusting flush volume as a function of urine concentration or solid contaminant (feces, toilet paper) quantity;
3. Providing a water-saving toilet having components that are not visible to a user of the toilet;
4. Recessing the optical devices (emitters/transmitters) away from a flow of toilet water, thereby decreasing dirtying/fouling of their optical windows;
5. Cleaning (or prevent dirtying/fouling of) the optical windows with a cleaning jet;

Because the toilet is already adapted to provide light signals of various wavelengths and intensities, it may be interesting to provide some "ambiance" lighting inside (and/or outside) the toilet.

It will be understood by those skilled in the art that the toilet bowl portion 4 of the toilet 1 is that portion at the bottom which normally contains water (i.e. the wet portion) and is made of a first volume that is typically visible to a user and a second volume that is typically not visible to a user. The receptacle portion 3 of the toilet 1 is a portion that is above the bowl portion 4 and designed to "receive" excrements that have not fallen directly into the bowl portion 4. It will be understood that a solid contaminant such as feces or toilet paper on the receptacle portion 3 (the dry portion) and not falling into the bowl portion 4 would not be identified/quantified by the water-saving system of the present invention. Normally, as the toilet 1 is flushed, water falling from the flange portion to the bowl portion 4 will cause any solid contaminant that was not already in the bowl portion 4 to fall thereinto. Another set of readings may also be taken after a first flush to ensure that the renewed volume of water in the toilet bowl 2 is clean, and to perform a second flush if this is not the case.

It will be understood that optical device 69 is used throughout the present document to mean the elements that are combined to cover the recess apertures made in the toilet bowl portion 4 and comprise the recess part, the lens holder part, the optical window/lens, the PCB holder, and the PCB which contains the electrical and optical elements required for emitting and transmitting various radiation wavebands. It will be understood that not all the parts are required and many can be combined into a single part for the purpose of emitting and detecting in various wavebands.

FIG. 10 is a cross-sectional schematic side view of a toilet 1 according to an embodiment of the present invention, where the optical devices are located near an upper junction point between Volume 1 and Volume 2. This location for the optical devices shows interesting reactivity to various contaminants while being located in an area of the bowl 2 which tends to decrease fouling of the optical windows.

Figure 11:
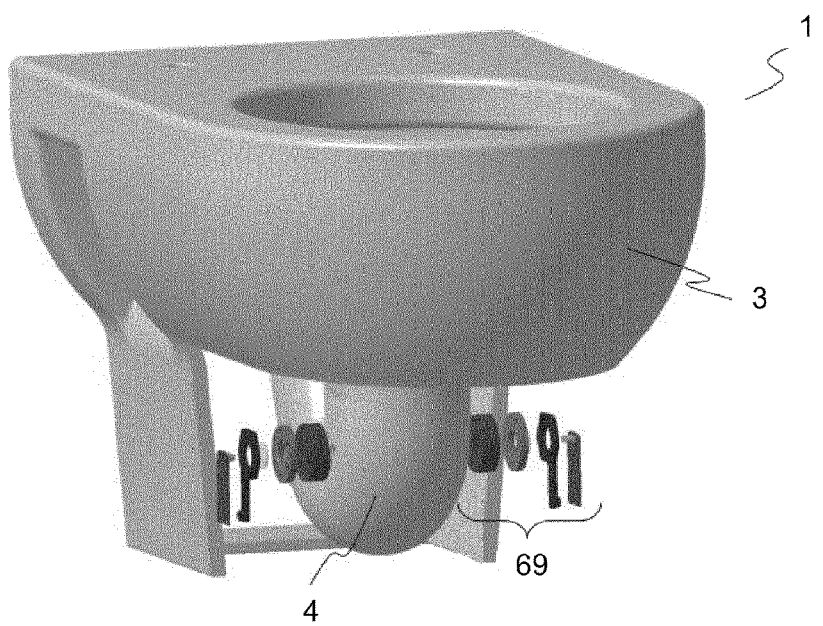
FIG. 11 is a front perspective view of a toilet with an exploded view of the optical devices according to an embodiment of the present invention.

FIG. 11 is a front perspective view of a toilet 1 with an exploded view of the optical devices 69 according to an embodiment of the present invention and represents the same view as FIG. 6 without the cutaway portion of the toilet bowl 2.

Figure 12:
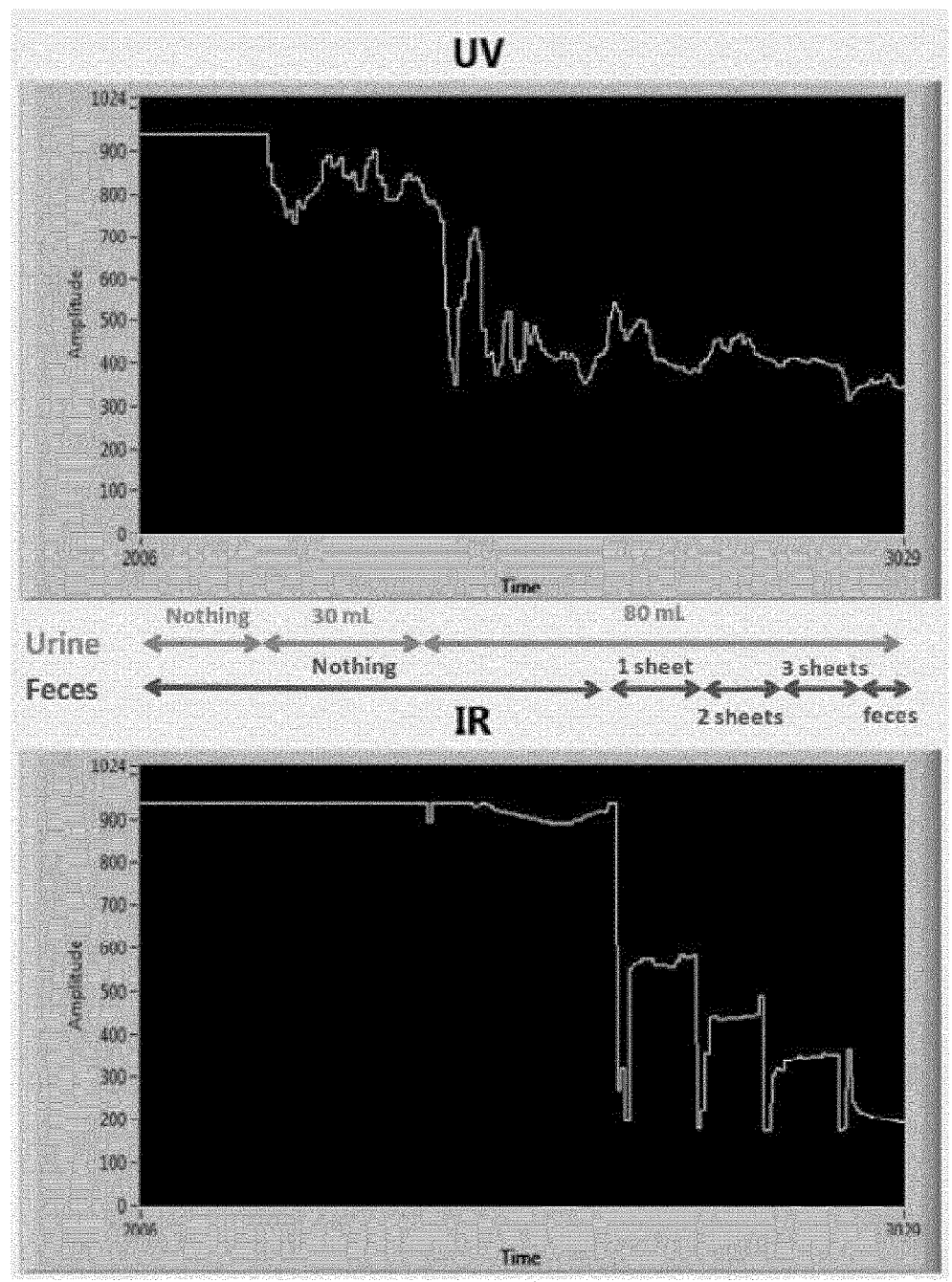
FIG. 12 shows UV and IR results obtained in an experimental demonstration using an embodiment of the present invention.

FIG. 12 shows an experimental demonstration using an embodiment of the present invention. FIG. 12 (top) is a graph plotting UV signal amplitude (intensity) as a function of time. An event time-line located under the graph depicts time points at which various contaminants were added to the toilet 1. Detected UV signal is a good indication of urine concentration found in the toilet bowl 2. The graph shows that during the initial period when no contaminant is present in the toilet bowl 2, the baseline signal amplitude is stable at approximately 935 arbitrary UV amplitude units (AUVAU). Adding 30 ml of urine causes a significant decrease in UV signal intensity, as detected by the UV detector due to an absorption of the UV by urine. Although the signal varies significantly, especially during the equilibration period, it will be appreciated that, with 30 ml of urine, the signal varies around an average value of ~850 AUVAU. Finally, in order to demonstrate the quantification capability of this system (or its ability to determine a relative or even absolute urine concentration) a further 80 ml of urine was added to the toilet bowl 2 and a further decrease in average amplitude to about 400 AUVAU was observed.

FIG. 12 (bottom) is a graph plotting IR signal amplitude (intensity) as a function of time. An event time-line located above the graph depicts time points at which various solid contaminants were added to the toilet 1. Detected IR signal is a good indication of a quantity of solid contaminants found in the toilet bowl 2. The graph shows that during the initial period when no contaminant (or just urine) is present in the toilet bowl 2, the baseline signal amplitude is stable at approximately 935 arbitrary IR amplitude units (AIRAU).

Adding 1 sheet of toilet paper causes a significant decrease in IR signal intensity, as detected by the IR detector. Although the signal varies a little, it will be appreciated that, with 1 sheet of toilet paper, the signal varies around an average value of ~575 AIRAU. Adding another sheet of toilet paper causes another significant decrease in the IR signal intensity, to an average value of approximately 450 AIRAU while another sheet causes a further drop in detected IR signal amplitude to approximately 340 AIRAU. Finally, a feces sample was added to the toilet bowl 2 and caused a decrease in signal intensity to an average value below 200 AIRAU. This experiment demonstrates the quantification capability of the system.

In some cases, it may be helpful to visualize signal intensities by using moving/rolling averages or various other data presentation methods (not shown).

It will also be apparent from the graphs shown FIG. 12 that there is no cross-"contamination" between the urine and solid contaminants. This is due to the absorption characteristics of the contaminants and the location of the UV and IR emitters and detectors. Indeed, adding solid contaminants (in this case toilet paper) does not affect the UV signal and adding urine does not affect the IR signal. Solid contaminants like toilet paper (and feces) likely do not affect UV signal due to the location of the UV emitters/detectors with respect to the floating contaminants.

While the invention has been described in connection with specific embodiments thereof, it will be understood that it is capable of further modifications and this application is intended to cover any variations, uses, or adaptations of the invention following, in general, the principles of the invention and including such departures from the present disclosures as come within known or customary practice within the art to which the invention pertains and as may be applied to the essential features herein before set forth, and as follows in the scope of the appended claims.

Moreover, one feature described with respect to one embodiment can be used in another embodiment.

The invention claimed is:

1. A water-saving system for a toilet comprising a toilet bowl, the water-saving system comprising:
   a first emitter configured to emit a first beam having a first wavelength;
   a second emitter configured to emit a second beam having a second wavelength;
   a detector unit configured to detect said first beam, the first emitter and the detector unit being arranged such that the first beam passes through a first portion of water contained in the toilet bowl before being detected by the detector unit;
   a controller configured to receive and process data from said detector unit, said data representing waste information of waste contained in the toilet bowl;
   a flush volume actuator actuated by said controller, the flush volume actuator being configured to vary a flush of a volume of water based on said data so as to minimize said volume of water;
   wherein the first wavelength is within the visible spectrum and comprises blue light,
   the first emitter, the detector unit and the controller configured for determining a concentration of soluble contaminants,
   wherein the second emitter and the detector unit are arranged such that the second beam passes through a second portion of the water contained in the toilet bowl before being detected by the detector unit, and
   wherein the first wavelength is different than the second wavelength, the second emitter and the detector unit configured for detecting solid contaminants.

2. The water-saving system according to claim 1, wherein the second wavelength is within a range of 590 to 900 nm.

3. The water-saving system according to claim 1, further comprising a third emitter configured to emit a third beam having a third wavelength,
   wherein the third emitter and the detector unit are arranged such that the third beam passes through a third portion of the water contained in the toilet bowl before being detected by the detector unit, and
   wherein the third wavelength is different than the first wavelength and the second wavelength.

4. The water-saving system according to claim 3, wherein the third wavelength is within a range of 300 to 495 nm or within a range of 590 to 900 nm.

5. The water-saving system according to claim 3, wherein the first emitter, the second emitter, or the third emitter includes a light emitting diode (LED).

6. The water-saving system according to claim 1,
   wherein the toilet bowl includes a bowl portion and a receptacle portion, wherein the bowl portion is configured to contain the water and the receptacle portion does not contain water except during a flush, and
   wherein the water-saving system further comprises a water supply device, wherein the flush volume actuator is configured to flush the volume of water from the water supply device.

7. The water-saving system according to claim 1, wherein the toilet bowl includes a bowl portion and a receptacle portion, wherein the bowl portion is configured to contain the water and the receptacle portion does not contain water except during a flush,
   the water-saving system further comprises a water supply device, wherein the flush volume actuator is configured to flush the volume of water from the water supply device,
   the first emitter or the second emitter is located in the bowl portion, and
   the detector unit is located in the bowl portion.

8. The water-saving system according to claim 1, wherein the toilet bowl includes a bowl portion and a receptacle portion, wherein the bowl portion is configured to contain the water and the receptacle portion does not contain water except during a flush,
   the water-saving system further comprises a water supply device, wherein the flush volume actuator is configured to flush the volume of water from the water supply device,
   the first emitter, the second emitter, or the detector unit is located outside the bowl portion,
   the first emitter or the second emitter is located either in the receptacle portion or on a piece attached to the toilet bowl, and
   the detector unit is located either in the receptacle portion or on a piece attached to the toilet bowl.

9. The water-saving system according to claim 1, wherein the toilet bowl includes a bowl portion and a receptacle portion, wherein the bowl portion is configured to contain the water and the receptacle portion does not contain water except during a flush,
   the water-saving system further comprises a water supply device, wherein the flush volume actuator is configured to flush the volume of water from the water supply device, the first emitter and the second emitter are located on a wall of the bowl portion substantially adjacent to one another and arranged to emit the respective first beam and the second beam towards the wall of the bowl at a location opposite from first emitter and the second emitter along a direction of the first beam and the second beam, the detector unit includes a first detector and a second detector, the first detector is arranged in the bowl portion at the location opposite from the first emitter and the second emitter, and the second detector is arranged on the wall of the bowl portion at a location that is angularly offset from the first emitter and the second emitter by an angle of 90°.

10. The water-saving system according to claim 9, wherein the first emitter and the second emitter are arranged substantially in a vertical longitudinal median plane of the toilet bowl.

11. The water-saving system according to claim 1 wherein
the first emitter, the second emitter, or the detector unit are installed in a hole arranged in the toilet bowl, said hole having an opening facing the inside of the toilet bowl, and the toilet further comprises a protective wall closing said opening, said protective wall being made of a material allowing transmission of the first beam or the second beam.

12. The water-saving system according to claim 1, wherein the second wavelength is within the visible spectrum and comprises orange light.

13. A water-saving system for a toilet comprising a toilet bowl, the water-saving system comprising:
a first emitter configured to emit a first beam having a first wavelength;
a detector unit configured to detect said first beam, the first emitter and the detector unit being arranged such that the first beam passes through a first portion of water contained in the toilet bowl before being detected by the detector unit;
a controller configured to receive and process data from said detector unit, said data representing waste information of waste contained in the toilet bowl;
a flush volume actuator actuated by said controller, the flush volume actuator being configured to vary a flush of a volume of water based on said data so as to minimize said volume of water;
wherein the first emitter is an IR emitter configured to emit IR radiation at a first signal intensity and at a second signal intensity for detecting solid contaminants, and
the detector unit is configured to detect the IR radiation passing through the first portion of the water contained in the toilet bowl.

14. A water-saving system for a toilet comprising a toilet bowl, the water-saving system comprising:
a first emitter configured to emit a first beam having a first wavelength;
a detector unit configured to detect said first beam, the first emitter and the detector unit being arranged such that the first beam passes through a first portion of water contained in the toilet bowl before being detected by the detector unit;
a controller configured to receive and process data from said detector unit, said data representing waste information of waste contained in the toilet bowl;
a flush volume actuator actuated by said controller, the flush volume actuator being configured to vary a flush of a volume of water based on said data so as to minimize said volume of water,
wherein the first emitter is a UV emitter configured to emit UV radiation, and
the detector unit is configured to detect the UV radiation passing through the first portion of the water contained in the toilet bowl, the first emitter and the detector unit configured for determining a concentration of soluble contaminants.

15. A water-saving system for a toilet comprising a toilet bowl, the water-saving system comprising:
a first emitter configured to emit a first beam having a first wavelength;
a second emitter configured to emit a second beam having a second wavelength;
a detector unit configured to detect said first beam, the first emitter and the detector unit being arranged such that the first beam passes through a first portion of water contained in the toilet bowl before being detected by the detector unit;
a controller configured to receive and process data from said detector unit, said data representing waste information of waste contained in the toilet bowl;
a flush volume actuator actuated by said controller, the flush volume actuator being configured to vary a flush of a volume of water based on said data so as to minimize said volume of water,
wherein the first wavelength is within the visible spectrum and comprises orange light,
the first emitter, the detector unit and the controller configured for detecting solid contaminants,
wherein the second emitter and the detector unit are arranged such that the second beam passes through a second portion of the water contained in the toilet bowl before being detected by the detector unit, and
wherein the first wavelength is different than the second wavelength, the second emitter and the detector unit configured for detecting soluble contaminants.

\* \* \* \* \*